United States Patent [19]

Kappel et al.

[11] Patent Number: 5,109,764

[45] Date of Patent: May 5, 1992

[54] DOUBLE SCREEN BELT PRESS WITH A WEDGE COMPRESSION ZONE FOR DEWATERING MIXTURES OF FIBROUS MATERIAL SUSPENSIONS

[75] Inventors: Johannes Kappel; Gunther Stock; Karl Eickhoff, all of Graz; Franz Petschauer, Lannach, all of Austria

[73] Assignee: Maschinenfabrik Andritz Actiengesellschaft, Graz, Austria

[21] Appl. No.: 587,695

[22] Filed: Sep. 25, 1990

[30] Foreign Application Priority Data

Sep. 25, 1989 [AT] Austria .................. 2229/89

[51] Int. Cl.⁵ .............................. B30B 9/24
[52] U.S. Cl. .......................... 100/99; 100/112; 100/118; 100/152; 134/166 R; 210/401
[58] Field of Search .......... 100/45, 112, 118, 151–154, 100/119, 120, 99; 134/166 R, 169 R; 210/391, 400, 401

[56] References Cited

U.S. PATENT DOCUMENTS

| | | | |
|---|---|---|---|
| 1,958,279 | 5/1934 | Morgan | 100/152 |
| 2,101,042 | 12/1937 | Casey | 210/401 X |
| 2,209,759 | 7/1940 | Berry | 100/112 X |
| 2,415,355 | 2/1947 | Kaufmann et al. | 100/152 |
| 3,459,122 | 8/1969 | Pastoors et al. | 100/118 |
| 4,236,445 | 12/1980 | Sernagiotto et al. | 100/118 |
| 4,341,628 | 7/1982 | Fujinami et al. | 210/401 X |
| 4,612,123 | 9/1986 | Eustacchio et al. | 210/401 X |

FOREIGN PATENT DOCUMENTS

| | | | |
|---|---|---|---|
| 288521 | 11/1915 | Fed. Rep. of Germany | 100/152 |
| 326494 | 3/1930 | United Kingdom | 100/152 |

Primary Examiner—Harvey G. Hornsby
Assistant Examiner—Stephen F. Gerrity
Attorney, Agent, or Firm—Roylance, Abrams, Berdo & Goodman

[57] ABSTRACT

A double screen belt press for dewatering mixtures of fibrous material suspensions has a wedge compression zone comprising rolls and perforated plates supporting generally upper and lower screen belts. For dewatering mixtures of fibrous material suspensions having a high dry solids content, at least one sealed material feed empties into the wedge compression zone with a high pressure. A generally vertically gravity tower with an outlet port is provided to feed material into the entrance of the wedge compression zone above the lower screen belt and in front of the front roll supporting the upper screen belt. The outlet port area of the material feed is sealed on at least the side facing the lower screen belt and optionally on the side facing the upper screen belt and on the other side of the material feed facing away from the wedge compression zone between the material feed and the lower screen belt.

19 Claims, 2 Drawing Sheets

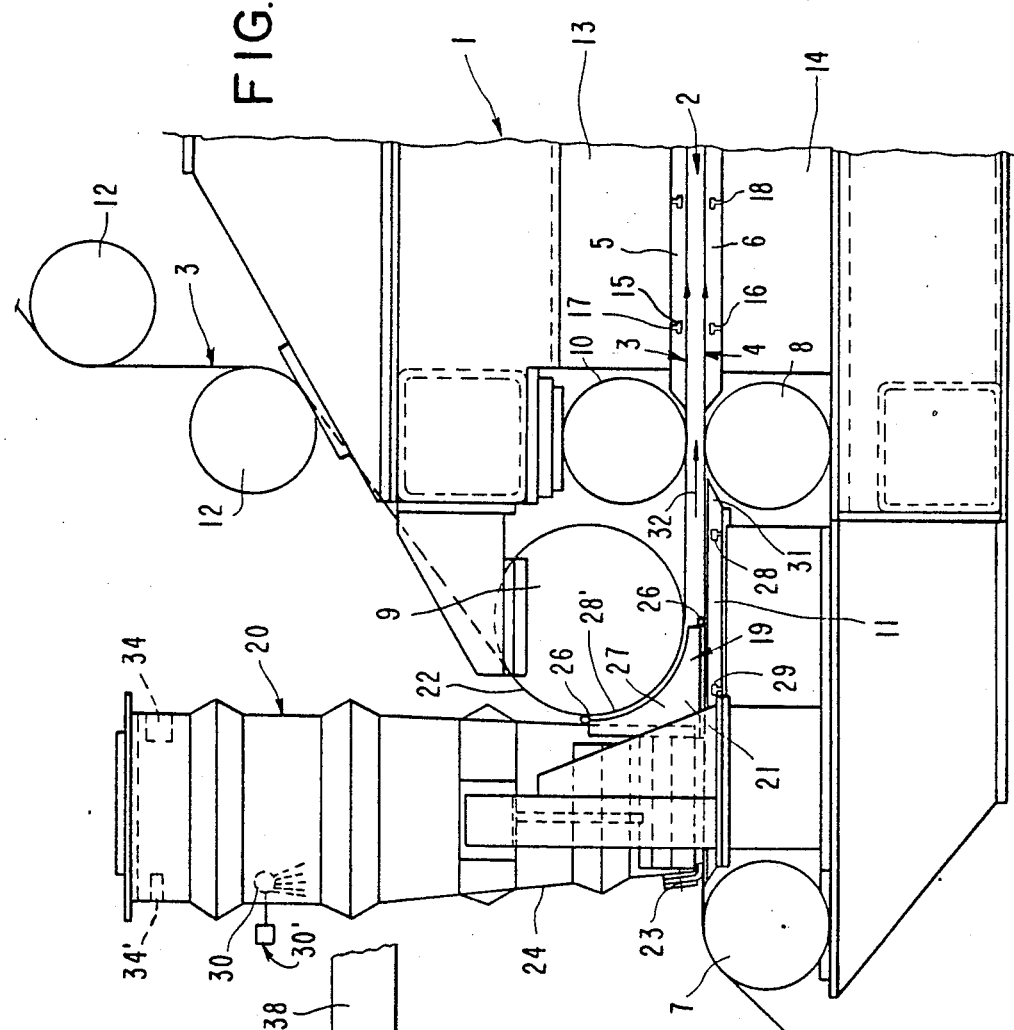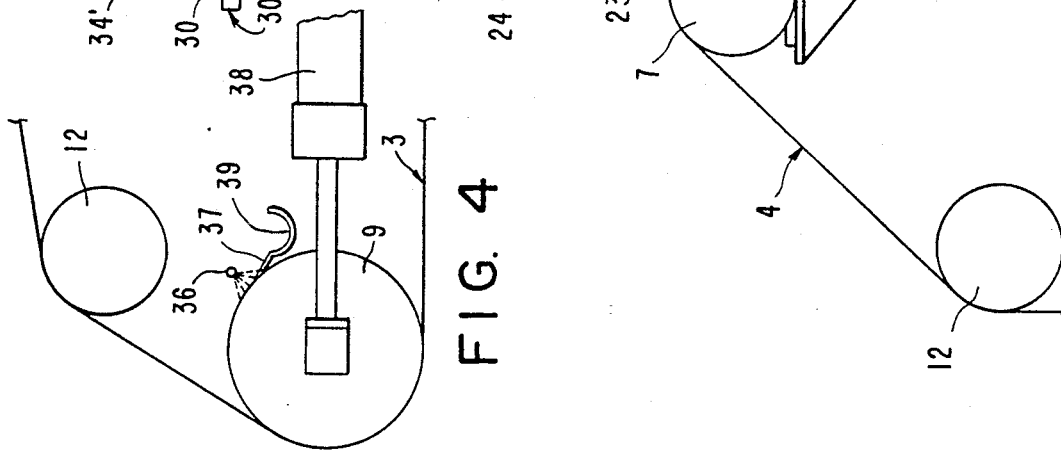

DOUBLE SCREEN BELT PRESS WITH A WEDGE COMPRESSION ZONE FOR DEWATERING MIXTURES OF FIBROUS MATERIAL SUSPENSIONS

BACKGROUND OF THE INVENTION

FIELD OF THE INVENTION

The present invention relates to a double screen belt press for dewatering mixtures of fibrous material suspensions. More particularly, the invention relates to a press having a material feed sealingly coupled to a wedge compression zone with rolls and perforated plates supporting upper and lower screen belts.

SUMMARY OF THE INVENTION

The press of the present invention, for dewatering materials having a high dry solids content or mixtures of fibrous material suspensions, comprises at least one material feed, substantially sealed from the environment, which empties into the entrance of a wedge compression zone of the press at a high pressure. The wedge compression zone has an upper screen belt supported by at least one front roll and a lower screen belt supported by at least one sliding plate. The screen belts travel past the material feed toward a generally horizontally extending compression zone in a facing relationship. A steep, generally vertical, hollow body or gravity tower, a pipeline with slightly increased pressure, or a conveying organ, such as a screw, material ejector or gravity shaft, is provided to feed material into the wedge compression zone via an outlet port in the material feed. The material is introduced from the material feed via the outlet port to the entrance of the wedge compression zone, which is located above the lower screen belt and in front of the front roll supporting the upper screen belt, extending between the material feed and the lower screen belt. The outlet port area of the material feed is sealed in a fluid-tight manner on at least the side of the lower screen belt adjacent the wedge compression zone and optionally on the side of the upper screen belt adjacent the wedge compression zone and on the side of the material feed facing away from the wedge compression zone. Sealing bodies adapted to the shape of the front roll or the front surface of the upper screen belt are tightly connected with the sidewalls of the outlet port of the material feed facing away from the wedge compression zone, and sealing strips are provided on the sides of the outlet port facing the compression zone. This virtually completely prevents the lateral escape of material, particularly in the area of the front roll when that roll is formed as a full width roll. The sidewalls of the outlet port are sealed to the body of the material feed and to the lower screen belt and the periphery of the front roll of the upper screen belt.

The introduction of material into the wedge compression zone is particularly facilitated if the front roll of the upper screen belt is formed as a full width compression roll or nip and the lower screen belt is supported and guided in the area of the outlet port by a sliding plate with a closed, i.e., unperforated, surface. This configuration is rendered effective and lightweight if the sliding plate is a plate-shaped body consisting of plastic material. The full width compression roll may have a diameter which is about fifty percent larger than the remaining guide rolls and drive rolls for the screen belts.

The special guidance for the pressing material fed through the outlet port as described above is maintained or constantly renewed according to the invention by designing the sliding plate to be exchangeable, in particular by providing the plate with T-shaped grooves extending transversely to the direction of the screen belt advance on its underside so that the plate can be slid in and out transversely to the screen belts on T-supports provided on the press frame.

With material having a high dry solids content, the invention permits especially troublefree operation and favorable starting and stopping of the press by providing flushing nozzles on the inside of the closed material feed which are actuable by a computer program, for example, particularly during the starting and stopping operation of the double screen belt press.

According to the invention, sealing leading lips extended in the screen belt advance direction may be provided in the area of the material feed on the lower screen belt, on both of the screen belts, or on the start of the compression nip or roll.

According to a further development o! the invention, the operational reliability and the functioning of the press or machine can be further increased by providing a pressure transmitter in the area of the material feed or headbox on the lower screen belt, both screen belts, or compression roll. The pressure transmitter controls the speed of the machine as a function of pressure at the material feed or at its outlet port. This control may also be effected by a level measurement.

A further improvement of the operation and the pressing and dewatering effect of the press can be achieved by equipping the system with a cleaning scraper combined with a flushing means located on the tension rolls, breast rolls, or full width compression roll provided at the start of the compression roll or delivery rolls provided on the end of the compression zone. Also, the axes and bearings of the rolls may be modified to be generally horizontally adjustable by hydraulic cylinders.

The invention is explained by means of exemplary embodiments with reference to the accompanying drawings.

BRIEF DESCRIPTION OF THE DRAWINGS

FIG. 3 an enlarged elevational view of the compression zone; and

FIG. 4 is a side elevation of a modified embodiment of the front roll in the compression zone.

DESCRIPTION OF THE PREFERRED EMBODIMENTS

The double screen belt press 1 for dewatering fibrous material suspension or the like, represented in FIGS. 1 through 4, is provided with upper screen belt 3 and lower screen belt 4 which travel through a wedge compression zone 2.

Figure 2:
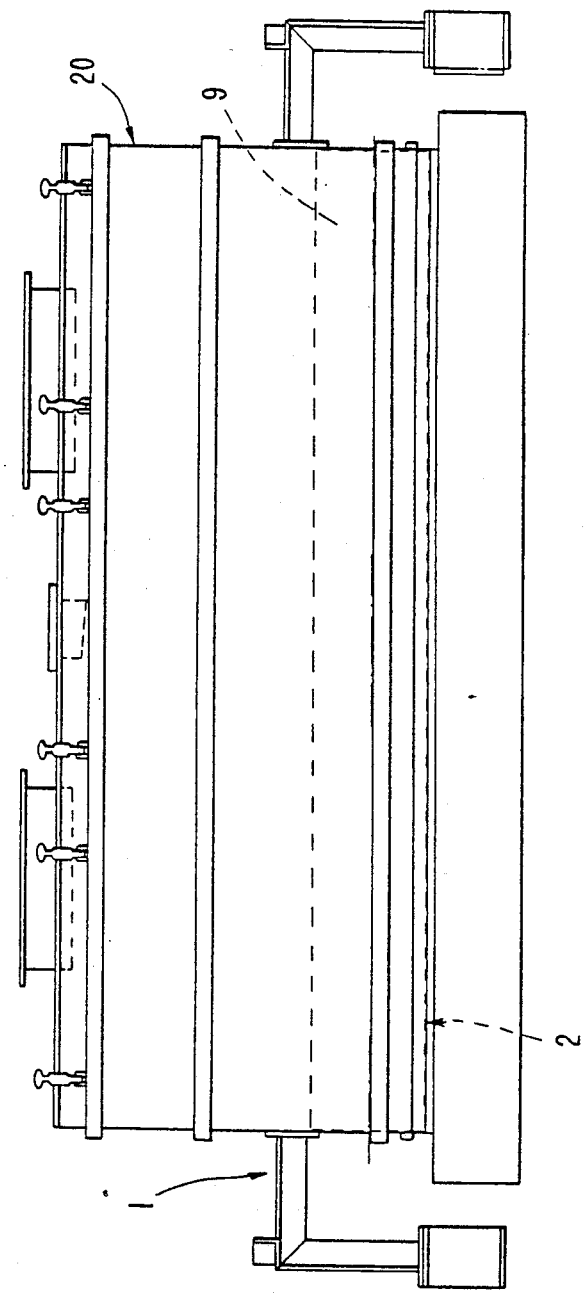
FIG. 2 represents a front view of the belt press.
Figure 1:
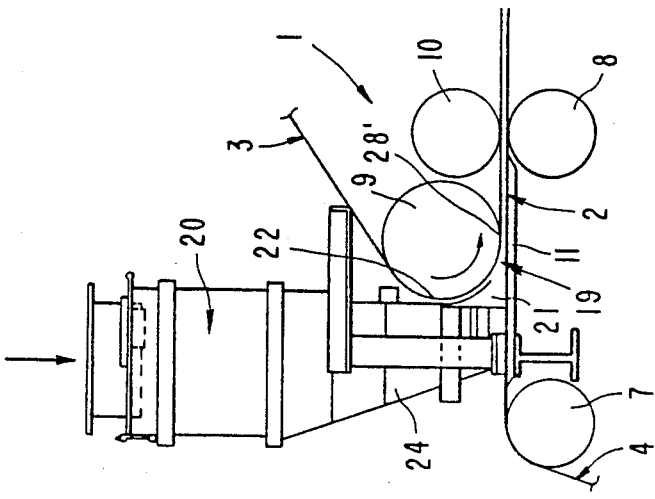
FIG. 1 shows an elevational view of the double screen belt press according to the present invention having a wedge compression zone.

As seen in FIGS. 1 and 3, wedge compression zone 2 begins at entrance 19. Upper perforate screen belt 3 travels over conventional support rolls 12 to front compression roll 9 and enters zone 2. Lower perforate screen belt 4 also travels over a conventional support roll 12, across roll 7, beneath material feed 20 and onto sliding plate 11 into zone 2. Sliding plate 11 may also be formed as an unperforated, water-impermeable screen belt table. Rolls 10 and 8 provide additional support to belts 3 and 4, respectively, if desired. Perforated plates or screen plates 5 and 6 support upper screen belt 3 and lower screen belt 4 in the portion of compression zone 2 which extends generally horizontally. On one or both sides of perforated plates 5 and 6 facing away from their respective associated screen belts, conventional suction boxes 13 and 14 may be provided as shown schematically in FIG. 3. Perforated plates 5 and 6 have T-shaped grooves 15 and 16 extending transversely to the advance of the screen belts which correspond with T-shaped supports 17 and 18 attached to the frame of press 1. Perforated plates 5 and 6 are laterally displaceable on supports 17 and 18 to be easily removed and replaced. Wedge compression zone 2 may be extended in press 1 by at least one additional dewatering or compression zone having pairs of rolls supporting screen belts or staggered rolls causing an S-shaped path of screen belts.

For the dewatering of fibrous material suspensions having a high dry solids content, at least one material feed essentially sealed from the environment empties with high pressure into entrance 19 of wedge compression zone 2. To feed material into compression zone 2, an approximately vertical hollow body or gravity tower 20 with an outlet port or hollow shoe 21 is provided at entrance 19 of wedge compression zone 2 above lower screen belt 4 and at the front side 22 of front roll 9 for upper screen belt 3. Pipelines subjected to slight increased pressure or having an ejection screw are also suitable feeding apparatus. In order to maintain the high pressure and to assure adequate guidance of the material, outlet port 21 of tower 20 is sealed on at least the side facing lower screen belt 4 and if necessary also on the side facing upper screen belt 3 by plastic sealing means 26, such as gaskets. The other side of tower 20, facing away from wedge compression zone 2, is also provided with a plastic seal 23 which seals tower 20 against lower screen belt 4. The cavity of tower 20 tapers toward lower portion 24. A pair of sidewalls, only sidewall 27 is shown, of outlet port 21 are attached to tower 20 and terminate at lower screen belt 4 and on the periphery 28' of upper screen belt 3 located at front roll 9). The material feed is also sealed against the environment between wedge compression zone 2 and both sides of feed tower 20 close to the edges of lower screen belt 4. Seals used in the present invention are preferably made of plastic material and may be configured as gaskets.

Front roll 9 of upper screen belt 3 is preferably formed as a full width compression nip or roll, but also may be a tension roll or breast roll. The diameter of roll 9 may be increased, in the instant case by about 50 percent, as compared to the diameter of the remaining guide and drive rolls 7, 8, 10, 12. Full width compression roll 9 has a length virtually corresponding to the width of screen belts 3 and 4 and the width of outlet port 21 of tower 20. This results in a particularly favorable material feed and distribution at the entrance 19 of wedge zone 2, since lower screen belt 4 is supported and guided in the area of the outlet port 21 of tower 20 by sliding plate 11 having a closed, i.e. unperforated, and smooth surface. Preferably, sliding plate 11 is a plate-shaped body consisting of plastic material which, similar to plates 5 and 6, is laterally displaceable or exchangeable, by T-shaped grooves 28 and T-shaped supports 29.

Flushing nozzles 30, shown schematically in FIG. 3, are provided on the inside of the closed material feed 20 and are actuated by the starting and stopping operation of the double screen belt press 1. Actuation of nozzles 30 is controlled by a computer 30', for example. The number of nozzles 30 used may be varied depending on the operating conditions.

Sealing leading lips 31 extended in the advance direction of screen belts 3 and 4, as shown by arrow 32, may be provided in the area of outlet port 21 on lower screen belt 4, on both screen belts 3 and 4, or at the entrance 19 of wedge compression zone 2.

A pressure transmitter 34 is provided in the area of material feed or head box 20, as shown schematically in FIG. 3. Transmitter 34 which may also be located on lower screen belt 4, on both screen belts 3 and 4, or on compression roll 9, controls the machine speed as a function of the pressure at material feed 20 or at its outlet port 21. Control can also be achieved by measuring the level in material feed 20 by a sonically operated pulse echo device 34' which controls the filling level in material feed 20 by controlling the material introduced and/or controlling the material discharge rate.

FIG. 4 shows a modification of full width compression roll 9 at the wedge compression zone entrance 19 in which roll 9 is provided with cleaning scraper 37 combined with a flushing means 36. The scraped-off material, and optionally the flushing water, are collected in collecting device 39 formed as a hook-shaped extension of scraper 37. Delivery rolls located at the end of press 1 may be equipped with a similar cleaning and adjusting arrangement. Additionally, the axis and bearing of roll 9 is adjustable by means of hydraulic cylinders 38 in a generally horizontal direction.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A double screen belt press for dewatering mixtures of fibrous material suspensions having a high dry solid content, comprising:

an upper perforated screen belt;

a lower perforated screen belt;

a wedge compression zone having supporting means for supporting said upper and lower belts in a generally facing relationship to each other to form a substantially horizontal initial portion of said compression zone, said supporting means for supporting said upper belt including a front roll with an outer circumferential surface engaging a portion of said upper belt, wherein said upper and lower belts extend through said compression zone; and an independent high pressure material feed coupled in a fluid-tight manner to the beginning of said compression zone for feeding said fibrous material suspensions under high pressure to said compression zone, said material feed having an outlet port with a pair of opposed sidewalls positioned above said lower belt and in front of said front roll such that said outlet port opens directly towards a portion of said upper belt supported on the circumferential surface of said front roll to force said fibrous material suspensions into said compression zone, and sealing means, coupled to said outlet port, for engaging said upper belt along said front roll in a fluid-tight manner, for engaging said lower belt in a fluid-tight manner between a portion of said material feed remote from said compression zone and said lower belt, and for engaging said side walls in a fluid-tight manner to laterally seal said upper and lower belts along said compression zone.

2. A press according to claim 1, wherein said supporting means includes at least one sliding plate.

3. A press according to claim 1, wherein
said supporting means for supporting said lower belt includes a sliding plate,
said sealing means for engaging said upper and lower belts engages said sliding plate in a fluid-tight manner and allowing said lower belt to pass therebetween.

4. A press according to claim 1, wherein said material feed includes a gravity tower having said outlet port.

5. A press according to claim 4, wherein
said gravity tower has a lower portion, at least said lower portion tapers downwardly.

6. A press according to claim 5, wherein
each of said side walls being sealingly coupled to said tower and being sealingly connected with said lower and upper belts by said sealing means for engaging said upper and lower belts.

7. A press according to claim 1, wherein
said front roll is a full width compression roll.

8. A press according to claim 1, wherein
said supporting means for said lower belt includes a sliding plate with an unperforated surface along said compression zone.

9. A press according to claim 8, wherein said plate is made of plastic material.

10. A press according to claim 8, wherein
said plate has an underside with T-shaped grooves for engagement with complimentary T-shaped supports.

11. A press according to claim 1, and further comprising
sealing leading lips extending in the advance direction of said screen belts and positioned against at least one of said upper and lower belts.

12. A press according to claim 1, and further comprising
control means for controlling speed of said upper and lower belts.

13. A press according to claim 12, wherein
said control means includes a means for measuring the level of material in said material feed.

14. A press according to claim 1, and further comprising
a scraper and means for flushing for cleaning said supporting means.

15. A press according to claim 1, wherein
said roll being adjustable in a horizontal direction.

16. A press according to claim 1, wherein
said roll being carried on an adjustable hydraulic cylinder.

17. A double screen belt press for dewatering mixtures of fibrous material suspensions, comprising:
an upper perforated belt;
a lower perforated belt;
a wedge compression zone having supporting means for supporting said upper and lower belts in a generally facing relationship to each other, wherein said upper and lower belts extend through said zone;
a high pressure material feed coupled in a fluid-tight manner to said zone;
flushing nozzles disposed within said material feed for flushing the fibrous material suspensions; and
actuator means for controlling said flushing nozzles upon starting and stopping of said press.

18. A press according to claim 17, wherein
said actuator means includes a computer.

19. A double screen belt press for dewatering mixtures of fibrous material suspensions, comprising:
an upper perforated belt;
a lower perforated belt;
a wedge compression zone having supporting means for supporting said upper and lower belts in a generally facing relationship to each other, wherein said upper and lower belts extend through said zone;
a high pressure material feed coupled in a fluid-tight manner to said zone; and
control means for controlling speed of said upper and lower belts, said control means including a pressure transmitter which controls speed of said upper and lower belts as a function of pressure within said press.

* * * * *

UNITED STATES PATENT AND TRADEMARK OFFICE
CERTIFICATE OF CORRECTION

PATENT NO. : 5,109,764
DATED : May 5, 1992
INVENTOR(S) : Kappel et al.

It is certified that error appears in the above-identified patent and that said Letters Patent is hereby corrected as shown below:

In column 5, line 25, delete "claim 5", and insert -- claim 4 --.

Signed and Sealed this

Third Day of August, 1993

Attest:

MICHAEL K. KIRK

*Attesting Officer*     *Acting Commissioner of Patents and Trademarks*